United States Patent [19]

Seidel

[11] Patent Number: 4,903,181

[45] Date of Patent: Feb. 20, 1990

[54] POWER CONVERTER HAVING PARALLEL POWER SWITCHING SYSTEMS COUPLED BY AN IMPEDANCE INVERSION NETWORK

[75] Inventor: Harold Seidel, Warren, N.J.

[73] Assignee: American Telephone and Telegraph Company, AT&T Bell Laboratories, Murray Hill, N.J.

[21] Appl. No.: 352,796

[22] Filed: May 16, 1989

[51] Int. Cl.⁴ .......................................... H02M 3/335
[52] U.S. Cl. ........................................ 363/16; 363/40; 323/210
[58] Field of Search ................. 363/16, 17, 97, 39–43, 363/131–134; 323/209, 210, 211

[56] References Cited

U.S. PATENT DOCUMENTS

| | | | |
|---|---|---|---|
| 4,024,452 | 5/1977 | Seidel | 363/16 |
| 4,355,243 | 10/1982 | Tellert | 363/40 |
| 4,484,295 | 11/1984 | Bedard et al. | 363/16 |
| 4,535,399 | 8/1985 | Szepesi | 363/16 |
| 4,709,317 | 11/1987 | Iizuka et al. | 363/40 |

FOREIGN PATENT DOCUMENTS

| | | | |
|---|---|---|---|
| 2355916 | 5/1975 | Fed. Rep. of Germany | 363/40 |
| 0001773 | 1/1981 | Japan | 363/40 |
| 0050017 | 3/1983 | Japan | 323/209 |

OTHER PUBLICATIONS

"A High Power Factor Tuned Class D Converter", *PESC '88 Record*, Apr. 1988, Seidel, H., pp. 1038–1042.

*Primary Examiner*—Peter S. Wong
*Attorney, Agent, or Firm*—Alfred G. Steinmetz

[57] ABSTRACT

A power converter includes an input primary switching system with its output connected to phase shift or impedance inversion circuit. These two circuits cooperate to function as a current source at the output of the impedance inversion circuit. A secondary switching system is connected in parallel with the output of the impedance inversion circuit and is switched synchronously with a controlled phase delay to the input primary switching system to synchronously charge a charge storage capacitor. The phase delay determines the voltage of the charge storage capacitor. An output load circuit is connected in parallel with both the output of the impedance inversion circuit and the input to the secondary switching system so that the capacitor voltage determined by the phase delay is controlling of the output voltage of the output load circuit.

28 Claims, 1 Drawing Sheet

POWER CONVERTER HAVING PARALLEL POWER SWITCHING SYSTEMS COUPLED BY AN IMPEDANCE INVERSION NETWORK

FIELD OF THE INVENTION

This invention relates generally to power converters having a parallel regulatory channel and an impedance inversion circuit in the power train. Such converters may be powered from an AC power line and are specifically adapted for maintaining a high power factor at the input to the power converter and the parallel regulatory channel is operative for regulating its output. It also addresses DC to DC converters adapted to maintain a specified output voltage over a wide range of input voltage.

BACKGROUND OF THE INVENTION

Regulation of power converters is typically accomplished by pulse width modulation achieved by controlling a duty cycle of the power switch or switches in response to a regulatory error signal. At low duty cycles the power switches conduct for a very short interval of the cycle. Due to the narrow current pulse the output circuit of the inverter requires a sizable inductor and capacitor to provide the energy storage requirements necessary to produce a substantially ripple free DC output signal.

If the power converter is powered from an AC power line it includes an input circuit that rectifies the AC voltage and filters it to supply a DC voltage at the input to the inverter section of the converter. This arrangement also typically requires an input rectifier with accompanying sizable inductive and capacitive components. Normally a charge storage capacitor is connected across the rectifier output. This capacitor quickly charges up to a DC voltage approximating the average value of the input AC voltage. This DC voltage backbiases the diodes of the rectifier during most of each half cycle of the applied sinusoidal voltage and hence the interval for conduction of the rectifier diodes in each half cycle of operation is very short. Short current spikes with a narrow conduction angle during the sinusoidal half cycles are generated and result in a poor power factor at the input to the rectifier.

This poor power factor at the input may be partially compensated for by inserting a low frequency inductor between the rectifier and the filter capacitor. This arrangement is generally not suitable if size of the converter is critical or if cost must be kept low because of the size of the inductor required.

Another technique to compensate for the poor power factor is to insert the inductor within the converter power train between the rectifier and the charge storage capacitor while varying the power switch duty cycle to obtain regulation. Here the switching frequency of the converter dictates the size of the inductor, however it may still be a sizable portion of the circuit package. A much higher frequency of operation often permits the use of a physically smaller inductor. However this arrangement imposes large stresses on the power switching devices of the converter during the on-off and off-on power switching transitions.

Active control of the current wave shape has also been used to control the input impedance to approximate a resistive load at the input and produce a very high power factor at the input. In one arrangement a boost type converter with a feedback control to control the duty ratio of its power switch is inserted between the input rectifier and the storage capacitor to control the current waveform so that it is substantially similar in waveform and in phase with the input sinusoidal voltage. A subsequent converter is used to achieve line and load regulation. This widely used arrangement however requires added circuitry that adds complexity to the overall power train and is operative solely to enhance the input power factor while complicating the overall power converter operation.

SUMMARY OF THE INVENTION

A power converter embodying the principles of the invention comprise an input primary switching system with its output connected to a phase shift or impedance inversion circuit. These two circuits cooperate to function as a current source at the output of the impedance inversion circuit. A secondary switching system is connected in parallel with the output of the impedance inversion circuit and is switched synchronously with a controlled phase delay to the input primary switching system to synchronously charge a charge storage capacitor. The phase delay determines the voltage of the charge storage capacitor. An output load circuit is connected in parallel with both the output of the impedance inversion circuit and the input to the secondary switching system so that the capacitor voltage determined by the phase delay is controlling of the output voltage of the output load circuit.

If the current output of the impedance inversion circuit is operated at a constant phase difference with the secondary switching system the current at the input of the rectifier of an AC powered converter is constrained to have a square waveshape. At full power the power switches of the primary switching system operate with zero voltage and current across and through the power switching devices during switching transitions of these devices. In a particular illustrative embodiment the impedance inversion circuit has a tee configuration and includes two inductors in series with an output of the primary switching system and a shunt capacitor connected at the junction of the two inductors. While a tee network form is shown, it is to be understood that other circuit forms are equally useful. A balanced phase shift circuit may be used to provide isolation for example if a transformer is not used to provide isolation.

In one particular embodiment of the invention the primary switching system comprises a totem pole switch coupled to feed a quarter wave phase shift circuit which interchanges current and voltage waveforms between its input and output in relation to the characteristic impedance of the network. This arrangement constrains current input from the AC power line to be dependent on a constant output voltage regulated by the power supply thereby constraining it to a substantially square waveform and hence eliminates the short interval spike current waveform that typically produces the adverse power factor at the input.

Regulation of the power supply output voltage is attained through dynamic phase control of the secondary switching circuit which includes a switched charge storage capacitor which stores a charge responsive voltage that in turn controls a voltage at the output of the quarter wave phase shift circuit. This in turn enables control of the load voltage of the power supply. This charge responsive voltage is controlled by the secondary switching circuit synchronized with the primary or inverter switching circuit. The phase delay between the primary and secondary switching is controlled in response to an error signal proportional to a deviation of the output voltage from its regulated value.

The secondary switching circuit is operated as a synchronous rectifier switched in concert with the primary switching system for unidirectionally charging the charge storage capacitor to a net charge value. It effectively controls the power flow to the load and also advantageously controls the waveshape of the input current supplied by the AC power source.

BRIEF DESCRIPTION OF THE DRAWING

An understanding of the invention may be readily attained by reference to the following specification and the accompanying drawing in which the sole FIGURE is a schematic of a power converter embodying the principles of the invention.

DETAILED DESCRIPTION

Figure 1:
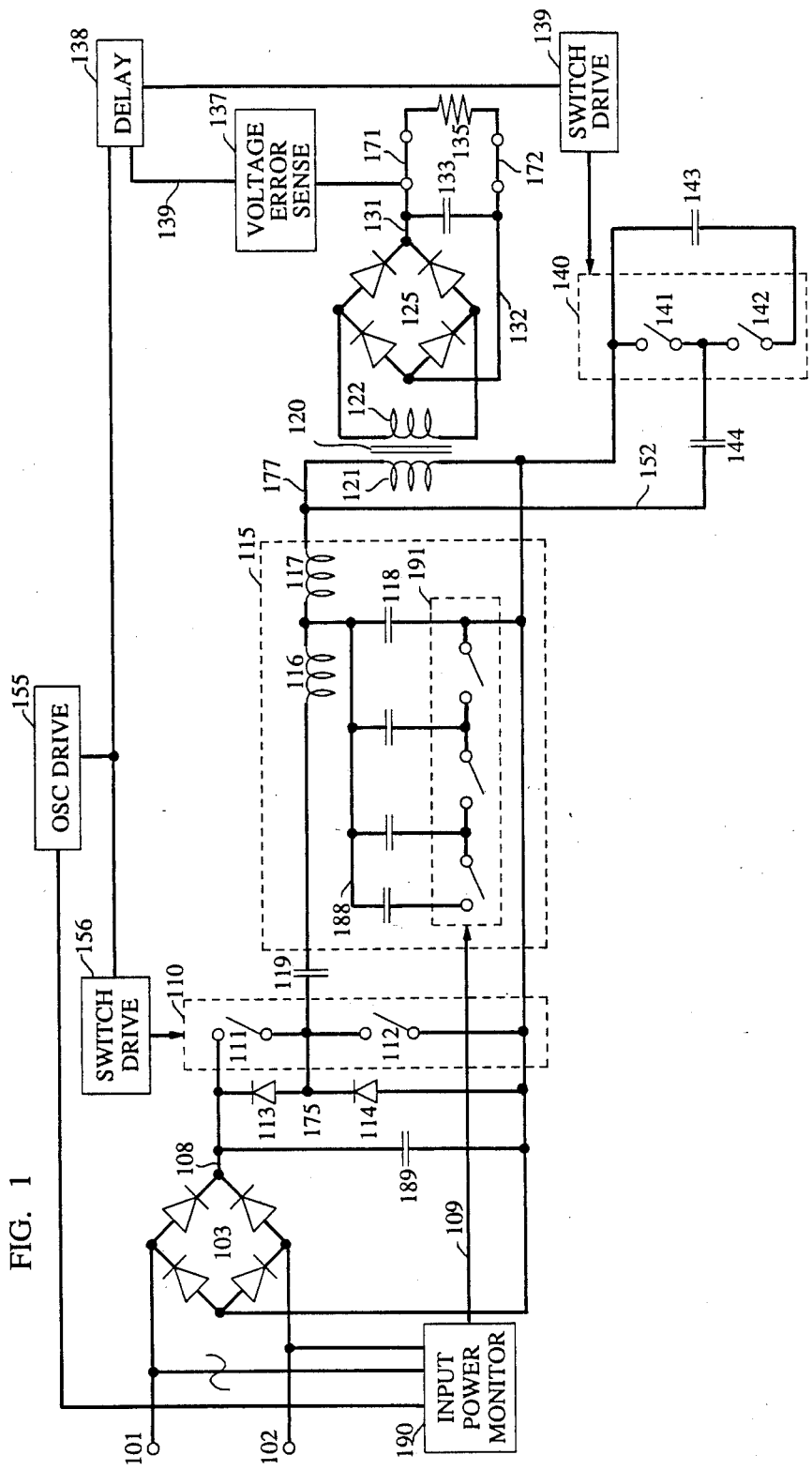

A schematic of a power converter connected as an off-line switching power supply and embodying the principles of the invention is shown in the sole drawing. The primary power switching system comprises a power switching half bridge inverter including two power switches 111 and 112, and two diodes 113 and 114 shunting power switches 111 and 112, respectively. An output node 175 of the half bridge inverter is connected, via a DC blocking capacitor 119, to a quarter wave impedance transformation circuit 115. The output of the impedance transformation circuit is connected to a secondary switching circuit 140 operated as a synchronous rectifier for charging a volt storage capacitor used in regulating an output voltage applied to the load 135.

Input power from an AC line power source is applied to input terminals 101 and 102 and coupled to a full wave rectifier 103. The output of the full wave rectifier 103 is connected, via leads 108 and 109, in parallel with a totem-pole connected primary switching arrangement 110 comprising two series connected power switches 111 and 112. Switches 111 and 112 may comprise semiconductor bipolar or FET switch devices or suitable equivalents. A full wave rectifier is required for FET switch devices because of their unidirectional characteristics. A high frequency shunt capacitor 189 may be connected from lead 108 to lead 109 to filter high frequency ripple, but should be small enough so that it does not store significant charge and backbias the diodes of rectifier 103.

Switches 111 and 112 are connected in parallel with diodes 113 and 114, respectively. Node 175 between switches 111 and 112 is connected to a quarter wave phase shift circuit 115, via a DC blocking capacitor 119. Switching of switches 111 and 112 is oppositely phased, as in a half-bridge type inverter, and is operative for sampling the rectified output of full wave rectifier 103. The inverter is preferably operated in a class D switching mode of operation with a substantially 50% duty cycle for each of the power switches. Blocking capacitor 119 and the reactances of filter 115 are tuned to the fundamental of the switching frequency so that at the 50% duty cycle of switching the drain-source capacitive charge of FET switches 111 and 112 are accommodated and appropriately discharged during switching transitions without energy loss. With proper tuning simultaneous occurrence of current and voltage during switching transitions can be limited. In the present illustrative embodiment the power switches are operated at substantially a 50% duty cycle as permitted by switching transition times.

Quarter wave phase shift impedance transformation circuit 115 comprises two series inductors 116 and 117 and a capacitor 118 all connected in a tee type low pass filter configuration having a cutoff frequency of substantially $f_s\sqrt{2}$ where $f_s$ is the switching frequency of the inverter switches 111 and 112. This circuit is designed to have a zero valued driving point impedance and at the switching frequency the impedances of the two inductors 116 and 117 and the capacitor 118 are all equal in magnitude and in turn equal to the characteristic impedance of the reactive circuit. The two series inductors 116 and 117 advantageously operate with less stress than an equivalent inductance embodied in a single resonating inductor. At the optimum 50% duty cycle the tuned network 115 is operative by constraining power flow to a single frequency through the network 115 to reduce switching transition power loss in switches 111 and 112 by minimizing the simultaneous occurrence of voltage and current through the switching device.

While the quarter wave impedance transformation circuit 115 is depicted as a symmetrical tee circuit other forms of this circuit may be utilized as long as the input and output impedances of the circuit are always inductive at high frequencies in order to avoid current surges. It must operate as a voltage source at its output to permit wide variations of the output or secondary switching inverter circuit 140.

The ouput of impedance transformation circuit 115 is connected in parallel to a regulation control circuit including a secondary series switch pair 140 and to a primary winding 121 of a power transformer 120. The impedance transformation properties of filter 115 convert the constant DC output voltage to a constant amplitude sinusoidal current at the input to filter circuit 115. Switching action of the totem-pole switch 110 and the associated diodes combined with a voltage-to-current inversion of the impedance tansformation circuit 115 constrains the input line current at input 101 to substantially approximate a square wave. This assures that the input power factor in a practical embodiment of this circuit is substantially enhanced to a 0.9 value.

This square wave voltage applied to the load has an amplitude;

$$V_l = \left(\frac{2}{\pi}\right) I_{rf} R_l \sin\theta \tag{1}$$

where: $V_l$ is the square wave voltage amplitude applied to the load; $I_{rf}$ is the peak value of the current source; and $R_l$ is the load impedance, and $\theta$ is the phase delay between primary and secondary switches.

The output voltage and power flow is controlled in response to a controlling charge stored on the synchronously charged capacitor 143. This capacitor 143 is charged unidirectionally by the secondary switching system 140 comprising switches 141 and 142. These switches may comprise semi-conductor bipolar of FET switch devices or suitable equivalents. Switching of these switches 141 and 142 is phase delayed with respect to switching of the switches 111 and 112. The phase delay is controlled by regulatory circuitry as described below to regulate the output voltage. Capacitor 143 is typically designed to store energy at moderately large voltages. Hence it is small compared with a typical storage capacitor in a DC-DC converter output but comparable with AC capacitors suitable for use at the line frequency. The voltage of the charge storage capacitor 143 is twice that of (1) and defined by the relation:

$$V_{cap} = \left(\frac{4}{\pi}\right) I_{rf} R_l \sin(\theta) \tag{2}$$

where: $V_{cap}$ is the voltage stored on the capacitor 143; and ($\theta$) is the phase lag between primary and secondary switching.

The normal range of phase delay between switching of the primary switching circuit 110 and the secondary switching circuit 140 is between −90 degrees to −180 degrees. Within this phase delay range power flow may be controlled over a range from maximum power to zero. The load current flowing in both primary and secondary switching circuits 110 and 140 lags the drain-source voltage of the individual power switches and prevents dissipation of the charge storage in the switches.

A secondary winding 122 of power transformer 120 is connected to a fullwave rectifier 125 whose output leads 131 and 132 are connected to a shunt filter capacitor 133 (no filter inductor is required) and output terminals 171 and 172. A load 135 to be energized is connected to output terminals 171 and 172. No filter inductor is required in this power circuit because of the flat constant square wave character of the rectifier excitation. Furthermore the rectifier output in virtually ripple free requiring small output capacitance.

The output voltage is monitored by a voltage error sensing circuit 137 which compares the output voltage at terminal 171 with a reference voltage and generates an error voltage proportional to a deviation of the output voltage from a regulated value.

Alternating drive is applied to drive the oppositely phased switches 111 and 112 by a switch drive circuit 156 which is in turn driven by an oscillator drive circuit 155. The output of the oscillator drive circuit 155 is coupled to the switch drive circuit 139, via a delay circuit 138 whose delay factor is controlled by an error signal on lead 159 supplied by the voltage error sense circuit 137.

The series connected switches 141 and 142, which control the charging of the capacitor 143, are driven in synchronism with, but phase delayed in proportion to the error signal from the power switches 111 and 112, respectively. The phase delay is controlled by a phase delay circuit responsive to the error signal and connected between the oscillator drive circuit 155 and the switch drive circuit 139.

Output lead 177 of the quarter wave transformation circuit 115 is connected, via a lead 152 and a DC blocking capacitor 144, to node 178 between switches 141 and 142. A charge storage capacitor 143 is connected in parallel with the switch circuit 140 and is charged unidirectionally by the alternate synchronous switching of switches 141 and 142. Its stored voltage is a function of the phase delay between the switching circuit 110 and the switching circuit 140.

Since the magnitude of the output voltage of the transformation network 115 applied to the primary winding 121 of transformer 120 is controlled by the voltage across capacitor 143 the load voltage is in turn regulated to the desired value.

A plurality of shunt capacitors 188 may be connected to be controllably in parallel with the capacitor 118 of network 115. These capacitors, when accompanied by a change in the operating frequency of the converter, permit a range change to accommodate changes in input power and still maintain the desired output voltage. Adding the capacitors 188 in parallel to capacitor 118 and reducing the operating frequency in proportion to the inverse square root of the total capacitance permits more power to flow into the converter from the input. Switching of these capacitors is controlled in response to an input power monitor 190 which senses input voltage at input lead 101 and closes the switches 191 to connect the capacitors 188 in parallel with capacitor 118 if the input power is degraded sufficiently. The input power monitor circuit also applies a signal, via lead 195, to the oscillator drive circuit 155 to effect the desired frequency change therein. Such alterations in oscillator frequency are believed to be within the skill of the art and hence are not disclosed in detail. This arrangement advantageously increases the voltage range over which the converter can operate and still provide the regulated output voltage.

I claim:
1. A power supply, comprising:
an input circuit for accepting an AC line;
an input rectifier connected to the input circuit;
a first switching circuit connected for switching the rectifier output;
a quarter wave impedance transformation circuit coupled to receive an output of the switching circuit;
a voltage level support circuit connected to an output of the quarter wave impedance transformation circuit, and including: voltage storage means and a second switching circuit for controlling a charge on the voltage storage means;
an output rectifier connected to an output of the quarter wave impedance transformation circuit and in parallel with the voltage level support circuit;
a load circuit connected to the output rectifier;
a voltage regulation circuit for regulating a voltage of the load circuit, including:
a control circuit for delaying switching of the second switching circuit relative to the first switching circuit;
2. A power supply as claimed in claim 1, wherein;
the first switching circuit includes first and second switching devices connected in series, and
the quarter wave impedance transformation circuit is connected to a node between the first and second switching devices.
3. A power supply as claimed in claim 2, wherein;
the second switching circuit includes third and fourth switching devices connected in a series connection and the voltage storage means is connected in parallel with the series connection, and
the second switching circuit operated in response to the voltage regulation circuit to control a voltage of the voltage storage means.
4. A power supply as claimed in claim 3, wherein; the first switching circuit is operated in a class D mode, and
a DC blocking capacitor is inserted between the first switching circuit and the quarter wave impedance transformation circuit, and both are tuned in com- bination to a fundamental of the switching frequency of the first switching circuit.

5. A power supply as claimed in claim 4, wherein;
the first switching circuit is a half bridge inverter in which first and second switching diodes are connected in parallel with the first and second switching devices; and
the first and second switching devices comprise semiconductor FET devices.

6. A power supply as claimed in claim 5, wherein;
the input rectifier is a full wave rectifier, and
the quarter wave impedance transformation circuit is a low pass tee filter circuit tuned to the switching frequency of the first switching circuit.

7. A power supply as claimed in claim 6, wherein;
the tee filter circuit comprises two inductors and a capacitor.

8. A power supply as claimed in claim 7, wherein;
the second switching circuit is operated with a phase delay with respect to the first switching circuit with the phase delay responsive to the voltage regulation circuit.

9. A power supply as claimed in claim 7, wherein;
a filter capacitor is connected to an output of the input rectifier.

10. A power supply as claimed in claim 7, wherein;
drive for the first and second switching circuits is supplied by a common oscillator circuit, and
the control circuit includes a phase delay circuit for delaying application of switching drive to the second switching circuit.

11. A power converter comprising:
a primary power switching system having an input for accepting a rectified AC voltage;
a quarter wave impedance inversion circuit connected to receive a switched output of the primary power switching system;
a secondary power switching system switched synchronously with the primary power switching system and connected to receive a current output of the quarter wave impedance inversion circuit;
a charge storage capacitor connected to be charged by the secondary power switching system;
an output circuit connected to receive a current output of the quarter wave impedance inversion circuit and having an output for accepting a load to be energized;
a control circuit adapted for monitoring a voltage at the output and control a delay in switching in the secondary power switching system with respect to the primary power switching system in order to maintain a voltage at the output at a regulated value.

12. A power converter as claimed in claim 11, wherein:
the first power switching system includes first and second switching devices connected in series, and
the quarter wave impedance inversion circuit is connected to a node between the first and second switching devices.

13. A power converter as claimed in claim 12, wherein:
the secondary power switching system includes third and fourth switching devices connected in a series connection and the charge storage capacitor is connected in parallel with the series connection.

14. A power converter as claimed in claim 13, wherein:
a DC blocking capacitor is inserted between the primary power switching system and the quarter wave impedance inversion circuit, and both are tuned in combination to a fundamental of the switching frequency of the primary power switching system.

15. A power converter as claimed in claim 14, wherein:
the primary power switching system comprises a half bridge inverter in which first and second switching diodes are connected in parallel with the first and second switching devices; and
the first and second switching devices comprise semiconductor FET devices.

16. A power converter as claimed in claim 15, wherein:
a DC blocking capacitor interconnects the primary power switching system to the quarter wave impedance inversion circuit;
the quarter wave impedance inversion circuit being a tee configuration circuit having reactive components; and
the combined DC blocking capacitor and the reactive components of the quarter wave impedance inversion circuit being tuned to the switching frequency of the primary power switching system.

17. A power converter as claimed in claim 16, wherein:
the tee configuration circuit comprises two inductors and a capacitor all having an equal impedance magnitude at an operative switching frequency of the power converter.

18. A power supply, comprising:
a primary power switching circuit adapted to be powered by an active AC line source, and including an input rectification circuit;
a quarter wave impedance transformation circuit connected to receive an output of the primary power switching circuit, and including at least first and second reactances tuned to resonance at a switching frequency of the primary power switching circuit and having a substantially constant current output;
a secondary switching circuit connected in parallel with an output of the quarter wave impedance transformation circuit and having power switches operating at a substantially full duty cycle and connected to apply output from the quarter wave impedance transformation circuit to charge a charge storage capacitor;
an output circuit for accepting a load connected in parallel with the output of the quarter wave impedance transformation circuit; and
control circuitry for controlling a phase of switching of the power switches of the secondary switching circuit relative to switching in the primary power switching circuit to control a charge on the charge storage capacitor in order to regulate a voltage across the load.

19. A power supply as claimed in claim 18, wherein the charge storage capacitor is operated with a voltage sufficiently high to permit it to store energy more efficiently than a storage capacitor at a voltage applied across the load.

20. A power supply as claimed in claim 19, wherein the current input to power switches of the secondary switching circuit is constrained to a sinusoidal waveform.

21. A power supply comprising
a first switching circuit operative as a voltage source at its output, and a switching frequency control for the first switching circuit;
an impedance inversion circuit having an inductive input impedance and coupled to receive the voltage source as an input, and the impedance inversion circuit operative as a current source at its output and including a tee configuration circuit comprising two inductive reactances and a capacitive reactance all having an equal impedance value equal to the characteristic impedance of the impedance inversion circuit at an operative switching frequency of the first switching circuit;
the capacitive reactance comprising a plurality of capacitor devices adapted to be selectively connected in parallel by a switching arrangement, and
a range control for responding to changes in power at an input to the first switching circuit by adjusting the switching frequency control to different frequencies and changing the capacitance reactance by selectively connecting capacitor devices in parallel to maintain a desired current output at the output of the impedance inversion circuit.

22. A power supply as claimed in claim 21 and further including:
a second switching circuit connected in parallel with an output of the impedance inversion circuit and having power switches operating at a substantially full duty cycle and connected to apply output from the impedance inversion circuit to charge a charge storage capacitor;
an output circuit for accepting a load connected in parallel with the output of the impedance inversion circuit; and
control circuitry for controlling a phase of switching of the power switches of the second switching circuit relative to switching in the first switching circuit to control a charge on the charge storage capacitor in order to regulate a voltage across the load.

23. A power system, comprising:
a primary switching circuit adapted to be energized by a power source, and an output of the primary switching circuit operative as a voltage source,
an impedance inversion circuit connected to convert an output of the primary switching circuit from a voltage source to a current source,
a secondary switching circuit having an input connected to the current source of the impedance inversion circuit and an output connected to an energy storage device,
an output circuit for accepting a load having an input connected to the current source of the impedance inversion circuit,
the secondary switching circuit operative as a control of power flow from the power source to the load.

24. A power system as defined in claim 23, wherein:
the power source is a DC power source.

25. A power system as defined in claim 23, wherein:
the power source is an AC power source, and
further including a rectifier for converting power from the AC power source to DC power for application to the primary switching circuit.

26. A power system as defined in claim 23, wherein:
a reactance of the impedance is controllably variable for changing an input power range to accommodate changes in input voltage.

27. A power switching system comprising:
a power switching system including;
a first switching circuit connected to a current source and including a quarter wave phase shift output circuit,
a second switching circuit connected to a voltage storage device,
the first and second switching circuits being connected in parallel,
a circuit for accepting a load to be energized, and
means for controllably phase delaying switching of the second switching circuit with respect to the first switching circuit in order to regulate a voltage at the load.

28. A power switching system comprising:
an input including a first power switching circuit and adapted for accepting a power source,
at least one secondary switching circuit connected to energy storage means,
an output circuit connected to the first switching circuit,
at least one of the secondary switching circuits connected to the first switching circuit and operative for controlling a signal at the output by controlling an energy storage level of said energy storage means.

* * * * *